United States Patent
Yeung et al.

(10) Patent No.: US 7,270,267 B2
(45) Date of Patent: Sep. 18, 2007

(54) SYSTEM FOR THIRD PARTY MANAGEMENT OF PRODUCT MANUFACTURE ORDERING BY A FRANCHISEE UPON APPROVED PRODUCTS OF FRANCHISOR

(75) Inventors: Herbert K. Yeung, Woodbury, MN (US); Yvonne M. Houle-Gillard, Eagan, MN (US); Troy J. Kilfoyl, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 724 days.

(21) Appl. No.: 09/820,398

(22) Filed: Mar. 29, 2001

(65) Prior Publication Data

US 2002/0143640 A1    Oct. 3, 2002

(51) Int. Cl.
*G06F 7/00* (2006.01)
*G06K 15/00* (2006.01)

(52) U.S. Cl. .................... 235/383; 709/223; 707/10; 707/104.1

(58) Field of Classification Search ............ 705/26, 705/27; 235/383; 707/10, 104.1; 709/223
See application file for complete search history.

(56) References Cited

U.S. PATENT DOCUMENTS

| | | | | |
|---|---|---|---|---|
| 5,758,327 A | * | 5/1998 | Gardner et al. ............ | 705/26 |
| 5,890,963 A | * | 4/1999 | Yen ........................... | 463/42 |
| 5,978,840 A | | 11/1999 | Nguyen | |
| 5,982,891 A | * | 11/1999 | Ginter et al. .............. | 705/54 |
| 6,052,669 A | * | 4/2000 | Smith et al. ............... | 705/26 |
| 6,112,263 A | * | 8/2000 | Futral ........................ | 710/37 |
| 6,134,534 A | * | 10/2000 | Walker et al. ............. | 705/26 |
| 6,266,651 B1 | * | 7/2001 | Woolston .................. | 705/27 |
| 6,324,522 B2 | * | 11/2001 | Peterson et al. ........... | 705/28 |
| 6,331,858 B2 | * | 12/2001 | Fisher ........................ | 705/26 |
| 6,484,150 B1 | * | 11/2002 | Blinn et al. ............... | 705/26 |
| 6,493,680 B2 | * | 12/2002 | Logan et al. .............. | 705/34 |
| 6,658,568 B1 | * | 12/2003 | Ginter et al. .............. | 713/193 |

(Continued)

FOREIGN PATENT DOCUMENTS

WO    WO9813796    2/1998

OTHER PUBLICATIONS 22 pages from www.c2media.com (Jul. 12, 2001).

(Continued)

*Primary Examiner*—Andrew Joseph Rudy
(74) *Attorney, Agent, or Firm*—Colene H. Blank

(57) ABSTRACT

A system includes a data storage device having franchisor approved product information. The system includes a franchisor network interface by which a franchisor can communicate with the data storage device and approve the product information, and a franchisee network interface providing network access by a franchisee to the franchisor approved product information. Product selecting and ordering by the franchisee is based upon the approved product information. The system also includes a third party network interface providing a third party access to the product orders and by which the third party manages access of the franchisor approved product information by the franchisee. The third party network interface permits the third party to communicate a product order to a manufacturer. The system further includes a manufacturer network interface by which the manufacturer can communicate with the data storage device to process the received product order in accordance with the approved product information.

15 Claims, 10 Drawing Sheets

U.S. PATENT DOCUMENTS

| | | | |
|---|---|---|---|
| 6,687,734 B1 * | 2/2004 | Sellink et al. | 709/203 |
| 6,871,232 B2 * | 3/2005 | Curie et al. | 709/225 |
| 6,948,070 B1 * | 9/2005 | Ginter et al. | 713/193 |
| 6,954,736 B2 * | 10/2005 | Menninger et al. | 705/28 |

OTHER PUBLICATIONS 5 pages from www.impresse.com (Jul. 12, 2001).
16 pages from www.noosh.com (Jul. 12, 2001).
13 pages from www.bannergalaxy.com (May 2, 2001).
3 pages from www.forbes.com (May 4, 2001).
14 pages from www.httprint.com (Jul. 12, 2001).
13 pages from www.printcafe.com (May 4, 2001).
Automatic Real-Time Data Collection: Revolutionizing Printing Management; DMI® —A White Paper, 2000 (8 pages).
E-Commerce in the Printing Sector: Utilizing the Internet to Increase Profitability; An E-Commerce White Paper (10 pages).
E-Commerce Exchange; A Special Report on E-Commerece and the Printing Industry, Jun. 2000.

* cited by examiner

This is to certify that the materials shipped herein comply with your specification and are listed below.

Buyer Purchase Order Number: ←— 40
Material Fabricator Invoice Number:

Materials Used:

Lot number   Roll number
                             ↙ 44

Product No. ____   □□   □□□□

↖ 42

Product No. ____   □□   □□□□

Product No. ____   □□   □□□□

All materials used are from : XYZ Company _____ are part of _____ System Warranty Program.

Certified by: _____

XYZ Manufacturer
John Doe 1234 5th Avenue,

Fig. 5

SYSTEM FOR THIRD PARTY MANAGEMENT OF PRODUCT MANUFACTURE ORDERING BY A FRANCHISEE UPON APPROVED PRODUCTS OF FRANCHISOR

FIELD OF THE INVENTION

The present invention is directed to a network based system and method to manage programs for the benefit of an end-user, such as a franchisor, parent company or company central office, with its sub-end-users, such as a franchisee, dealer or regional office. In particular, the present invention facilitates product orders by a sub-end-user based upon approved product(s) or specifications for products set out by an end-user.

BACKGROUND OF THE INVENTION

The ability for a centralized decision maker (end-user) to set up programs including the provision of approved products or specifications usable by its related sub-users (sub-end-users) requires an end-user to make such approval and then to transmit the approved product information to its sub-end-users. Programs of this type are often set up in situations between a franchisor, a parent company, or company central office and its franchisee(s), dealer(s), or regional offices(s).

A common situation where a program is defined by an end-user for use by its sub-end-users is one that requires approved product information for marketing purposes. In this case, product or product information specifications may be set out or approved by an end-user from which any of its sub-end-users may select. For example, approved graphics or graphic information may be displayed by an end-user or transmitted to its sub-end-users so that the sub-end-user can select the graphic products that it would like to use in its business. Many types of companies have these types of marketing programs with its sub-end-users, such as fast food franchisees, car dealers and company regional offices. These programs may provide approved text, pictures, colors, logos, etc. and any combination thereof, as the product or product information that a sub-end-user may use for the benefit of the approving end-user. Moreover, such programs may also set out how such product is to be displayed or how it is to be constructed, including product specifications and materials, by or for the sub-end-user. Often, a third party manufacturer (that may also be selected by or approved by the end-user) will actually make such a product for the sub-end-user based upon the specifications of the end-user.

Typically, a marketing department of an end-user company will display or otherwise transmit the approved materials to its sub-end-users. Intra-company networks or any public or private internet are know to be usable for such information transmission. This action may also be facilitated by a third party, such as a product manufacturer or a material supplier that shows approved graphics, for example, to a sub-end-user. Such a third party would be motivated to do so on the potential benefit of selling its services or materials in making the product. However, without access of a third party to internal communication means of a company, it is difficult to be an effective part of their program. Furthermore, even with the approval of the end-user as a service provider or material supplier, the sub-end-users are likely to be less influenced by the third parties marketing efforts. To effectively do so, such a third party would need to not only market its services or materials to the end-user, they would also need to make specific marketing efforts to each sub-end-user. Conventionally, this means having a sales/marketing representative visit each potential end-user and sub-end-user.

The "world wide web" of the "internet" has become more recently utilized as a means to permit approved materials to be transmitted from an end-user to its sub-end-users. One known technique is for a company to display its approved product information on a web page accessed through the internet so that its sub-end-users can see their choices of approved products. A web page may be provided by the company itself, such as on its publicly viewable web page. Alternatively, a web page may be provided by a third party web provider or software group that sells such a consulting service to end-users and may also show the end-user how it can display its product information to be viewed by others including its sub-end-users. A company a consulting service as part of corporate identity programs is Monigle Associates, Inc. of Denver, Colo.

Another web-based solution that is known is that where a contract service is provided to an end user. For example, a company may contract with a service provider or web host in order to facilitate the access by sub-end-users to end-user approved product information.

SUMMARY OF THE INVENTION

The present invention provides a system and method by which an end-user can effectively communicate its approved product information or product specifications to its sub-end-users. Thus, such an end-user can more effectively manage any program that it wishes to communicate and support with its sub-end-users.

The present invention also provides a system and method by which an end-user to sub-end-user program can be effectively managed by a third party. That is, instead of merely servicing the communication need between the end-user and the sub-end-user as a service provider, an interested third party can also market its services, materials or other products to the sub-end-users effectively while facilitating the end-users need to communicate its program or approved information to its sub-end-users.

Information may also be managed to/from other interested third parties, such as material suppliers or product manufacturers or material convertors. Such a system and method may also advantageously accommodate input or additional information from other parties like designers, consultants, and the like for the benefit of the end user and/or its sub-end-users.

Preferably, the system and method permits a third party, such as a material supplier to manage product orders by sub-end-users of product approved by an end-user. More preferably, the system and method can facilitate order placement by a sub-end-user, which order is communicated with a manufacturer, and which manufacturer may accept or provide a counter-proposal in response. The order may include product specifications as approved by the end-user with or without other options and may specify selected product materials based upon a particular application and in accordance with approved materials of the end-user with or without other options. Another advantage is that an interested third party, such as a material supplier or manufacturer, can connect warranty compliance certification information along with the completion of the order based upon the manufacturer warranty or material warranty. The manufacturers may be chosen by a sub-end-user from an approved list and/or regional list provided by the end-user and communicated as well by the system and method of the present invention. Any number of other options, selections, with similar parties or additional parties may be further accommodated by the system and method of the present invention.

These and other advantages in accordance with the present invention can be achieved by a system for third party management of end-user approved product information to at least one sub-end-user and product ordering by a sub-end-user based upon the approved product information of the end-user, the system comprising a data storage device accessible via a network and having end-user approved product information stored in a first memory, a sub-end-user network interface providing network access by the sub-end-user to the end-user approved product information for ordering a selected product and by which a product order can be stored in a second memory, and a third party network interface having access to product orders stored within the second memory.

Preferably, the third party network interface also permits a third party to communicate a product order to a manufacturer via the network. A manufacturer network interface can also be provided by which the manufacturer can communicate with the data storage device via the network so that the manufacturer can review and process product orders, update job status, and communicate with the third party via the network.

More preferably, the system further comprising an end-user network interface by which the end-user can communicate with the data storage device via the network so that the end-user can create and modify new programs with specified product information by manipulating the end-user approved product information stored in the first memory. Each of the sub-end-user network interface, the third party network interface, the manufacturer network interface and the end-user network interface are also preferably browser based web page interfaces that are stored on the data storage device and that are accessible via the network.

These and other advantages in accordance with the present invention can also be achieved by a method of ordering a product by a sub-end-user based upon end-user approved product information provided to the sub-end-user including the steps of providing access via a network to a sub-end-user for permitted reviewing of an electronic catalog having product information of at least one product that is approved by the end-user, the sub-end-user selecting a product from the electronic catalog and making a product order based upon product information that is approved by the end-user, communicating the product order from the sub-end-user to a third party via the network, and the third party submitting the product order to a product manufacturer.

Preferably, the sub-end-user selects and makes its product order via a network interface that includes access to the electronic product information, and wherein the product order is communicated to the third party from the network interface. Moreover, the third party can access the product order via a second network interface and submits the product order to a manufacturer via the network. Preferably, the third party also reviews the product order for any product material and services that are supplied by the third party so that it can specify, if appropriate, any commercial material sold by the third party to be utilized by the manufacturer in making the ordered product. Thus, the manufacturer can issue a notice to the third party certifying compliance of manufacture with the specifications communicated to it by the third party so that the third party can start its warranty coverage of the manufactured product based upon the inclusion of commercial material of the third party. The network may include any private or public network, intranet or internet.

BRIEF DESCRIPTION OF THE DRAWINGS

FIG. 5 is an example of an informational graphic providing a certification of compliance that may be issued in accordance with the present invention based upon the inclusion of specified materials within the product manufactured and to be delivered to a sub-end-user in accordance with the system and method of the present invention;

DETAILED DESCRIPTION OF THE INVENTION

Figure 1:
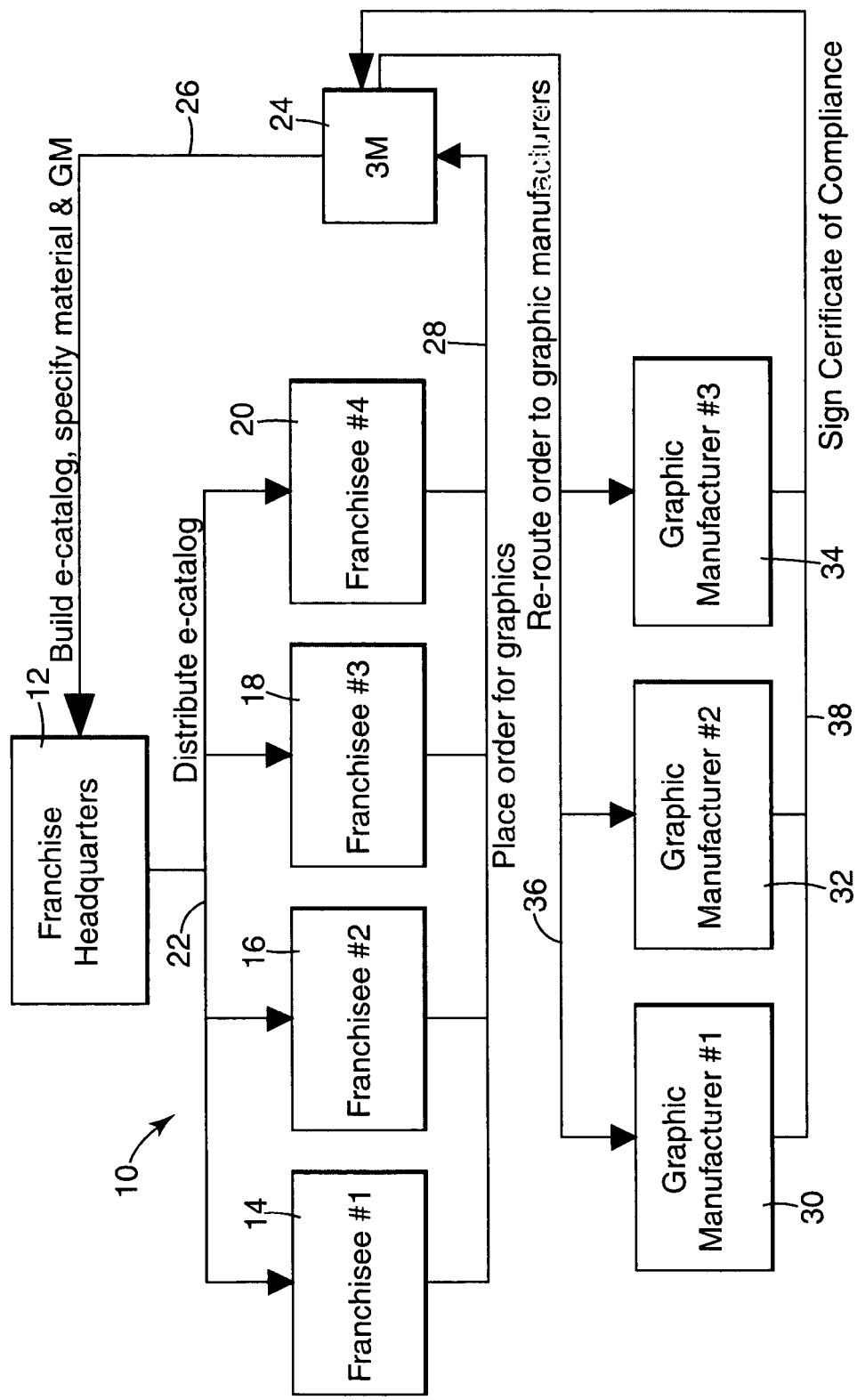
FIG. 1 is a schematic diagram of a network based system and method for managing product information distribution and product ordering by a sub-end-user based upon approved product information provided by an end-user, which system and method is managed by a third party for placing orders with other third party manufacturers, fabricators or convertors.

With reference to the attached figures, wherein like components are labeled with like numerals throughout the several figures, a network based system and method are illustrated whereby end-user approved product information can be effectively communicated to its sub-end-users. Moreover, systems and methods in accordance with the present invention permit a third party to manage not only the communication between an end-user and its sub-end-users, but also to facilitate product ordering by the sub-end-users and routing of the orders to the appropriate manufacturer, fabricator or convertor.

The present invention is directed to a network based system and method, which network may comprise any private or public network, intranet or internet, or combination thereof. Preferably, the present invention utilizes the public "Internet," and in particular the World Wide Web portion thereof to facilitate communication between an end-user, its sub-end-users, one or more third parties that may include material suppliers, consultants, designers or developers, and manufacturers, fabricators or convertors. Depending on a specific application, an internal network may suffice in accordance with the present invention, although a network having some public aspect is preferred where outside material or service vendors are to have access to the system.

The present invention will be described below in accordance with one representative situation in accordance with the present invention. Specifically, that situation involves the provision of graphics products. More particularly, the system and method described below facilitates and permits management of graphic product ordering by sub-end-users based upon approved graphical images and application methods approved and distributed by an end-user. The end-user can manage this communication and the further transmittal of order placement information from a sub-end-user to any one of selected manufacturers, or, as illustrated, a third party may assist or control such management based upon approval of the end-user.

In the case of graphics products, an end-user, such as a corporate headquarters or franchisor, will select and approve graphical images that it will make available to its sub-end-users, such as dealers, regional offices, or franchisees, in the promotion of product or services of the sub-end-user. Moreover, the end-user will often wish to specify application methods, for example window graphics, wall graphics and the like, for graphics, banners, brochures, and other marketing materials, that the sub-end-user is to follow. That is, any number of images or other graphical representations (including specified text, formats, fonts, etc.) may be approved and distributed by or on behalf of the end-user so that its sub-end-users can select such graphical materials in accordance with their approved application methods for use in their business. An end-user may further wish to approve and manage the relationship between its sub-end-users and the manufacturers, fabricators, or convertors that may be utilized by the sub-end-users. Again, the management of this relationship may be conducted by a third party for the benefit of the end-user.

A third party may be specifically interested in managing such a system and method based upon its ability to market its product or services as well. For example, one of the manufacturers, fabricators or convertors may wish to manage this system in order to market its services as the manufacturer, fabricator or convertor. Likewise, a third party consultant, designer or developer may wish to manage such a system to market its services. In accordance with the preferred version of the system and method of the present invention, a third party material supplier may manage such a system in order to market its materials to be incorporated within the product manufactured as specified by the sub-end-users and/or the end-user. In accordance with a preferred version of the present invention, a powerful tool is created by which a third party can market its services or materials and by which effective communication of approved information and product ordering can be managed all the way through manufacturing and compliance with product specifications.

As set out above, a system and method of the present invention is preferably set up to utilize the public Internet with or without additional internal, private or public networks, internets or intranets. In any case, is preferred that the system utilize web based information technology so that information can be communicated and transmitted via the Internet between all interested parties. For example, parties may utilize browser technology (or any other known or developed systems) to view specific web pages designed and linked appropriately to facilitate the steps of the present invention. As described in greater detail below, a web page can effectively provide viewing of approved graphics and related graphical information as network interfaces for viewing and information input by an end-user, any of its sub-end-users, one or more third parties, and any number of manufacturers. As known, product may be ordered directly from such a web page, which product order may be based upon product specifications including any number of options chosen by a sub-end-user on a web page network interface. Moreover, any number of informational graphic network interfaces can be provided in web page format for web browser viewing of information relating to product ordering, tracking, acceptance and for any other related information transmittal in any direction.

Referring to FIG. 1, a network based system and method in accordance with the present invention is illustrated. Specifically, a network 10 is schematically illustrated between an end-user 12 and a number of sub-end-users 14, 16, 18 and 20. It is understood that only one sub-end-user may be associated with the end-user or that any additional number of end-users may be associated with end-user 12. As noted above, the end-user 12 may comprise any corporate identity, franchisor, business or the like and that the sub-end-users 14-20 may comprise any associated company or business entity, such as a company subsidiary, regional office, dealership, or franchisee, or the like. The present invention is particularly applicable in any situation where the end-user 12 seeks to have some control or approval process over a program with its sub-end-users.

As a graphics management system, an end-user 12 would develop and/or approve graphic information that may be in the form of images, text, formatting, colors, etc. related to the marketing and sales of a product that may be available from its sub-end-users 14-20. The end-user 12 may develop and build a catalog of its graphic information from which its sub-end-users 14-20 can select graphic products that it would like to use at its business or otherwise in connection with its business. Preferably, where a web page provides the interface for viewing access by the sub-end-users, or where product information is distributed electronically, the catalog includes electronically viewable images, as are known and used commonly with Internet based e-commerce. Such a catalog can be known as an e-catalog that may be accessed and viewed or downloaded by any sub-end-user 14-20 by way of its network interface. The distribution and/or ability to view such an e-catalog is designated in FIG. 1 as network portion 22 schematically interconnecting end-user 12 with sub-end-users 14-20. Moreover, the graphics information can advantageously include digital graphics information so that, for example, a digitized image can be viewed by a sub-end-user 14-20 and the digitized image can be further utilized in providing product specifications for ordering graphics products as detail below.

An interested third party that facilitates or at least assists in managing such a system and its network 10 is illustrated as block 24. Between the third party 24 and the end-user 12, a network interface 26 is schematically represented by a system portion, which network interface 26 comprises the action of a third party 24 developing or building the e-catalog with the end-user 12. The development or building of such an e-catalog is an initial step conducted with or without the assistant of a third party 24 prior to distribution by an end-user 12 to its sub-end-users 14-20.

Importantly, the interface 26 provides an opportunity for the third party 24 to market its services or materials to the end-user 12, which service or material the end-user 12 may recommend or specify for use by its sub-end-users 14-20 as appropriate depending on each particular application. In the case of graphics materials, the third party 24 may preferably comprise a supplier of graphic materials, which graphic materials are marketed in order to have graphics products fabricated that have certain features, characteristics, and qualities associated with that parties products.

After any sub-end-user 14-20 has the opportunity to view approved graphics products and application methods, that sub-end-user 14-20 may then place an order for a graphics products. The ordering step is schematically illustrated at system portion 28, which ordering step 28 may be based on a decision-making process of the sub-end-user 14-20 that ranges from the simple to the complex. That is, the sub-end-user 14-20 may order a graphics product, for example, that is complete without options and which the sub-end-user 14-20 merely selects. On the other side of the spectrum, the graphics product may be highly customizable and require many input selections or specifications of the sub-end-user 14-20. Input selections are provided through the sub-end-user network interface. As examples, required input may include sizing information, choice of application techniques, materials to be utilized based upon product characteristics or the like, colors, customized text, quantities, and in the number of other related features. Some or all of these options may include recommendations by the end-user 12. Any number of these features may be set by the end-user 12, instead, while others remain optional. Choices for one optional feature may or may not be more limited than any other feature.

Moreover, the sub-end-user 14-20 may specify the manufacturer, fabricator or converter for a particular application as well as an installer of the graphics product. The manufacturer, fabricator or converter and any installer may be selected by a sub-end-user 14-20 in accordance with the web browser based techniques discussed above from choices given to it by the end-user 12, or specified base upon its own knowledge and information.

Any number of manufacturers, fabricators or converters, hereinafter manufacturers 30-34, may be associated with the network of the present invention. Preferably, such manufacturer 30-34 will have access to the network based system 10 of the present invention by a manufacturer network interface so that it can receive orders electronically and respond in the same manner. Moreover, where digitized graphical information is provided as part of the product specification, it is easier for the manufacturer 30-34 to use the digital information in a its manufacturing process, i.e. to incorporate the specified graphic onto the specified materials. Any such manufacturer 30-34 may be preselected by end-user 12 as based on any preference of the end-user 12, such as regional access or other arrangements with end-user 12. Alternatively, the manufacturers 30-34 may be recommended by the end-user 12 or by the third party 24 based upon any number of circumstances. As a further alternative, the sub-end-users 14-20 may select a desired manufacturer 30-34 for other reasons, in which case it may be necessary to specify additional information for directing the order to the specified manufacturer 30-34, and to do so electronically, if possible.

Again, so long as any graphic manufacturer 30-34 has access to the network 10, such as via the Internet, electronic ordering can be facilitated.

In accordance with the preferred system version shown schematically in FIG. 1, third party 24 may also be integral in the ordering process 28 and a routing step 36, wherein product ordering information and specifications are transmitted to the appropriate manufacturer 30-34. The routing step 36 may comprise receiving or accessing electronic order information by the third party network interface from one or more of the sub-end-users 14-20 and transmitting the order information appropriately to the selected manufacturer 30-34. Other value added activities may be conducted by third party 24 and within the routing step 36 as well. For example, the order from any sub-end-user 14-20 may be reviewed by third party 24 for content and correctness based upon its own information or information obtained from the end-user 12. Third party 24 may confirm placement of the order by sub-end-users 14-20 back to them. Furthermore, third party 24 may provide additional information, recommendations or solicitations back to the sub-end-users 14-20 based upon their order related to additional or other related products.

Also, importantly, the third party 24 can review the order to see whether or not its services or materials have been specified. If the third party's 24 services or materials are specified, the third party 24 may be motivated into its services activity or to set up material supply to the appropriate manufacturer 30-34. Moreover, the use of a particular service or material of the third party 24 within the graphics product might initiate a warranty or representation situation based upon such use. If such a warranty might arise, other information may be investigated for compliance, for example information of other materials, services, approved manufacturers, and the like.

Preferably, network 10 further includes the ability for a compliance notice step 38 to be conducted. Although it is contemplated above that the manufacturers 30-34 may provide acceptance, counter-proposal, status information and the like to the sub-end-users 14-20 (directly or via third party 24) in accordance with the network 10 of the present invention, compliance step 38 is primarily directed to information for third party 24. Specifically, in the case where material or services of the third party 24 are incorporated within the graphics product produced by the graphic manufacturer 30-34, the manufacturer 30-34 might provide a certificate of compliance to the third party 24. The certificate of compliance is also preferably an electronic document that can be transmitted from any manufacturer 30-34 to the third party 24 via the network 10.

Proof of compliance with standards of third party 24 may advantageously initiate the start of warranty coverage on behalf of the sub-end-users 14-20 as provided by third party 24. An example of such a certificate of compliance is illustrated in FIG. 5. In the case where third party 24 is a material supplier whose material is incorporated within the graphics product manufactured by any of manufacturer 30-34, a certificate by the manufacturer 30-34 that it has in fact utilized the one or more specific materials of third party 24 would be important to third party 24 to begin its warranty coverage of the graphics product. Preferably, such a certificate would specify product related information 40, such as the buyer purchase order number, an invoice number, and identify the product names 42 of the third party commercial materials that have been used in the graphic product as they relate to a subject warranty. If appropriate, such as where the materials are used from manufacturer stock, additional information 44 related to the lot number and roll number are preferably further specified. Also, in the case where the manufacturer 30-34 is aware of the warranty program, the certification may specify by them that the materials subject to the warranty have been used in accordance with manufacturing standards or as a system according to their known warranty information.

As also known to be used with electronic commerce, particularly involving the Internet, electronic signatures may be utilized in each of the communications between parties and in accordance with a present invention. In particular, the placement of specific orders, acceptance, and compliance certificates should preferably include electronic signature capable of legally binding the relevant parties. Any known or developed technology may be utilized for this function.

A system in accordance with the present invention preferably permits third party management of end-user approved product information to at least one sub-end-user and product ordering by a sub-end-user based upon the approved product information of the end-user. Such a system comprises any known or developed data storage device accessible via a network. Preferably, such a data storage device would also have processing ability as well known, such as conventional servers and computer workstations. The data storage device would thus have the end-user approved product information stored in a first memory thereof. The sub-end-user network interface provides the network access by the sub-end-user to the stored end-user approved product information for ordering a selected product so that one or more product orders can be stored in a second memory. By the terms first and second memory, it is meant merely that both sets of information are stored within the data storage device memory in any way. The third party network interface preferably also has access to product orders stored within the second memory.

Preferably, the third party network interface also permits a third party to communicate a product order to a manufacturer via the network. A manufacturer network interface can also be provided by which the manufacturer can communicate with the data storage device via the network so that the manufacturer can review and process product orders, update job status, and communicate with the third party via the network.

More preferably, the end-user network interface permits the end-user to communicate with the data storage device via the network so that the end-user can create and modify new programs with specified product information by manipulating the end-user approved product information stored in the first memory. Each of the sub-end-user network interface, the third party network interface, the manufacturer network interface and the end-user network interface are also preferably browser based web page interfaces that are stored on the data storage device and that are accessible via the network.

Figure 2:
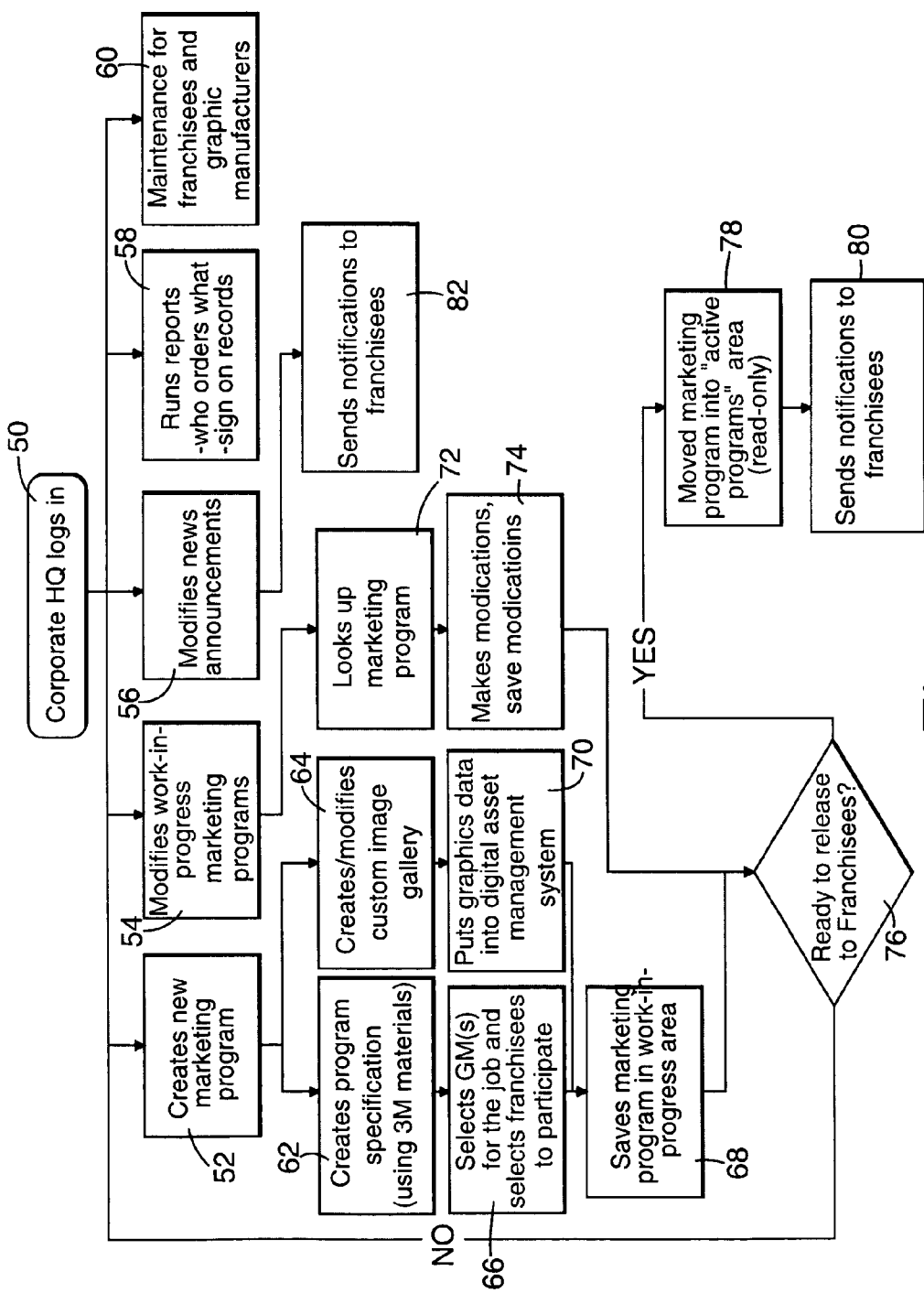
FIG. 2 is a schematic diagram of the process steps available for an end-user to control, approve and distribute product information to its sub-end-users in accordance with a system and method of the present invention.

With reference to FIG. 2, a specific example of the process and decisional steps are illustrated that may be made available to an end-user 12 in its ability to control, approve and distribute product information to its sub-end-users in accordance with a system and method of the present invention.

Step 50 represents the point at which an end-user initially logs on to the system. Preferably, the end-user would have to enter a user ID and login password to get into the system. Moreover, as above, it is preferred that the system interface be browser web based. Diagram blocks 52, 54, 56, 58 and 60 in FIG. 2 represent those decisional steps from which an end-user may choose to proceed. It is understood that any number of initial selections may be provided, more or less than that illustrated, and in accordance with present invention.

Block 52 is the start of a process track directed to the creation of a new marketing program. Block 54 represents the start of a decision to modify an existing marketing program. At block 56, an end-user may choose to enter a program for modifying news and announcements, while block 58 gives the end-user the option to run any of various records and reports. Block 60 is designated as the entry into a program for maintaining a franchisee and graphic manufacturer database. In the case where these initial steps take place in a browser web based system, the end-user could simply choose to enter any one of the above programs as well known by way of web page linking technology.

After entering the program for creating a new marketing program as indicated by block 52, the end-user may be provided the choice between creating a new program specification, represented by block 62, or for managing its custom image gallery, block 64. If creating a new program specification, the end-user sets up the program as indicated at block 66 by at least selecting its sub-end-users that are to participate in the particular program. Preferably also, the end-user will specify the manufacturers from which the sub-end-users may choose. Also, the end-user will specify from its custom image gallery the particulars of such a program and then associate the appropriate graphic images with the program. Then, as indicated at block 68, the end-user will save the new marketing program as an existing marketing program then to be accessible through the program started at block 54, noted above. As indicated at block 64, instead of opting to create a new program, the end-user can choose to create or modify its custom image gallery. This step represents the creation and loading of any graphic image into a database or electronic gallery of its custom images. Block 70 represents the step of associating specific graphics data into a digital asset management system that may be provided by the third party 24, for example, so as to provide a data base of high resolution graphic files on behalf of the end-user 12, its end users 14-20 and the graphic manufacturers 30-34, which manufacturers can use these files in making the ordered graphic product. A centralized management system is advantageous in that an end user can control all subsequent viewing and product making based upon those images that they can approve or change by controlling a single file.

If the end-user chooses to modify an existing marketing program starting at block 54, such end-user can first look up any of its existing marketing programs and select one to modify as indicated at block 72. Any known or developed technology for searching a database or list of stored information may be utilized for this purpose, or all existing programs may be listed on a screen so that the end-user may simply select one to modify. Block 74 represents the actual step of making modifications and saving such modifications so that the existing program is now changed.

Once either a new marketing program has been created, block 68, or an existing program has been successfully modified, block 74, the end-user is given the decision to release the program, new or modified, to its sub-end-users as indicated at decisional step 76. Once a program is released to its sub-end-users by the end-user, it is preferred that such marketing program be designated as an "active program," at block 78, and that it be available to sub-end-users as a "read only" program. That is, sub-end-users will now have access to the specifics of the marketing program for reviewing but not modifying the program. Block 80 represents a preferred additional step of sending a notification to the sub-end-users so that they are aware of the new or modified marketing program.

Under block 56, where end-user chooses to create or modify any news message or announcement, block 82 represents the notification function to the sub-end-users. Within block 58, the end-user may run reports from any number of custom or canned reports relating to any number of activities, such as what orders have been placed by its sub licensees with which manufacture. Block 60, as above, represents any activities that end-user may need to perform for maintaining its database of sub-end-users and manufacturers. It is contemplated that within this step, other similar databases related to any other third party related to this process may be created and/or maintained.

Figure 3:
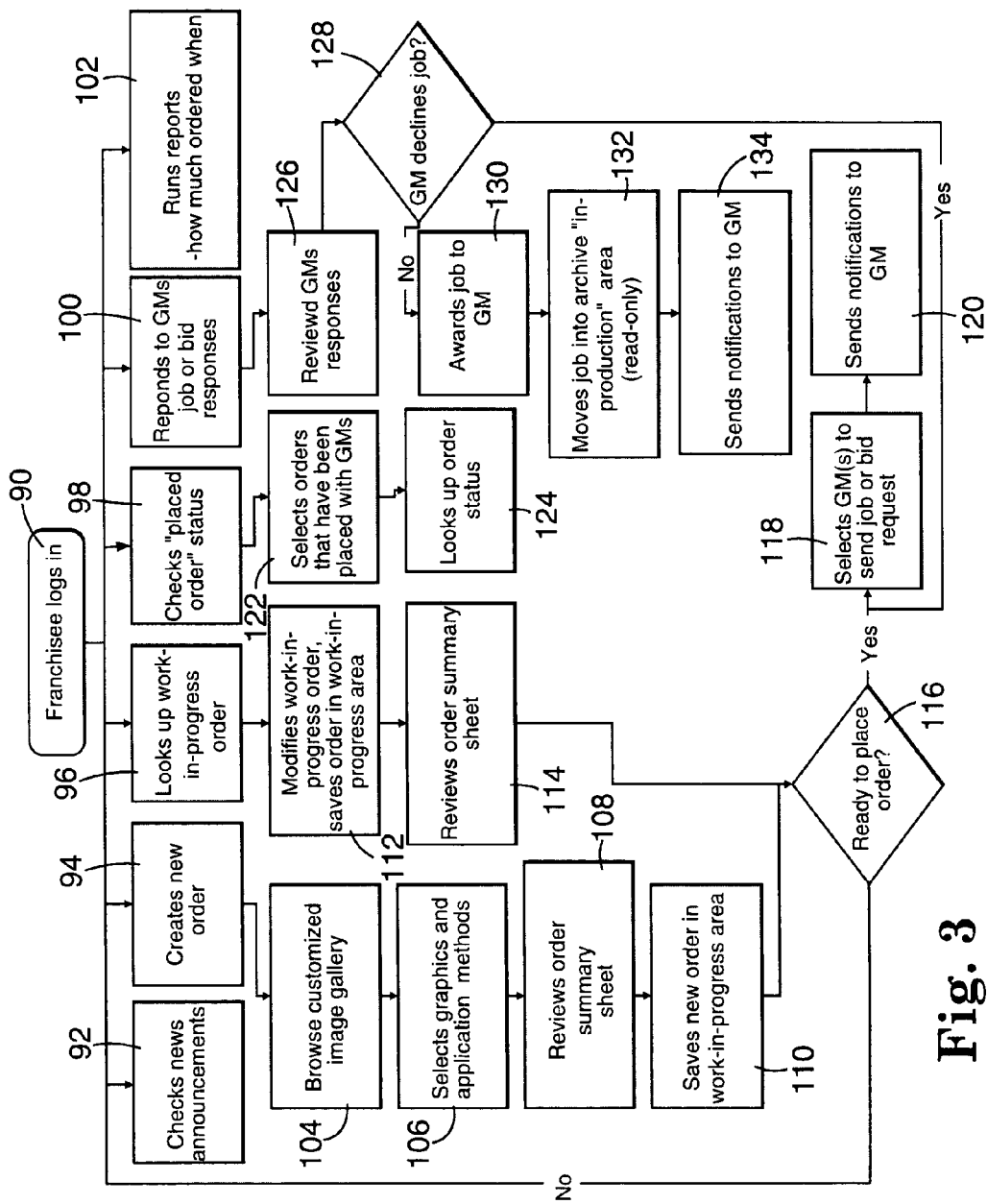
FIG. 3 is a schematic diagram of the process steps available for a sub-end-user to view product information distributed from an end-user, to submit new product orders, to track or modify ordered work in progress, and to check status of or acceptance of orders in accordance with a system and method of the present invention.

FIG. 3 schematically illustrates a specific example of the process and decisional steps that may be made available to a sub-end-user in order to view new marketing programs and associated product information distributed from an end-user, to submit new product orders, to track or modify ordered work in progress, and to check status of or acceptance of orders in accordance with a system and method of the present invention.

The process starts at block 90 where a sub-end-user logs into the system. As above, it is preferable that the sub-end-user be required to submit a user ID and password to gain access to the system. The sub-end-user will then be faced with any number of system choices as are represented by blocks 92, 94, 96, 98, 100 and 102. Block 92 represents a decision of the sub-end-user to check for news and announcements from the end-user. Block 94 begins a process for creating a new order. Block 96 starts a process for looking up a work-in-progress order (not yet placed), while block 98 starts a related process of checking placed order status. Block 100 starts a process for responding to a manufacturer based upon job information or a bid response. Block 102 represents a sub-end-users ability to run reports relating to its orders and the like.

In the process of creating a new order, block 94, the sub-end-user faces a series of additional steps. Specifically, the sub-end-user may initially browse the customized image gallery set up by the end-user, block 104, followed by the actual step of selecting specific graphics and application methods, block 106. At block 108, the sub-end-user is giving the opportunity to review an order summary sheet, and at block 110, the sub-end-user saves the new order within its work-in-progress area prior to actually placing the order.

As indicated at block 96, the sub-end-user may look up any work in progress order for the possibility of modifying it or placing it. Block 112 represents the sub-end-users modification of a work in progress order and saving it again as a work in progress order. At block 114, the sub-end-user is provided the opportunity to review a summary sheet, again prior to actually placing the order. Decisional step 116 is indicated as available to the sub-end-user after the creation of a new order and saving thereof in the work in progress area, block 110, or after a work in progress order has been modified and reviewed, block 114. If the answer is NO, the new and modified orders are maintained as they have been saved and the sub-end-user is returned to the initial choice screen.

If the sub-end-user is ready to place the order, a YES decision at decisional step 116 leads to the sub-end-user selecting a manufacturer, block 118, and sending notification to the manufacturer, block 120. Block 118 may represent actually placing a specific order as a new job, or requesting a bid from a specific manufacturer (one or more) as to a potential new job.

Block 98 represents an initial selection available to sub-end-users for checking its "placed orders." Preferably, orders that are placed and accepted are archived (as noted below) within a list or database, from which a sub-end-user may select or search to find any particular order that has been placed, block 122. Once a placed order has been found, it's status may be checked as represented by block 124.

Block 100, as one of the initial selections, permits the sub-end-user to look at responses from manufacturers related to orders that it has placed and bid responses. As indicated at block 126, one or all responses from manufacturers can be reviewed by the sub-end-user. As related to any specific job, decision step 128 asks whether or not a job has been declined by the designated manufacturer. If the answer is YES, the sub-end-user is taken back to the step for selecting a manufacture in placing a new order. Such a new order would proceed as described above. If, instead, the answer is NO, the indication is that the manufacturer is willing to accept the job. Thus, block 130 indicates a decision to award the job to the chosen manufacturer and block 132 represents the change in status of the job as "in production" where it is archived in preferably "read only" format. Block 134 indicates a notification sent to the manufacturer of the award.

Figure 4:
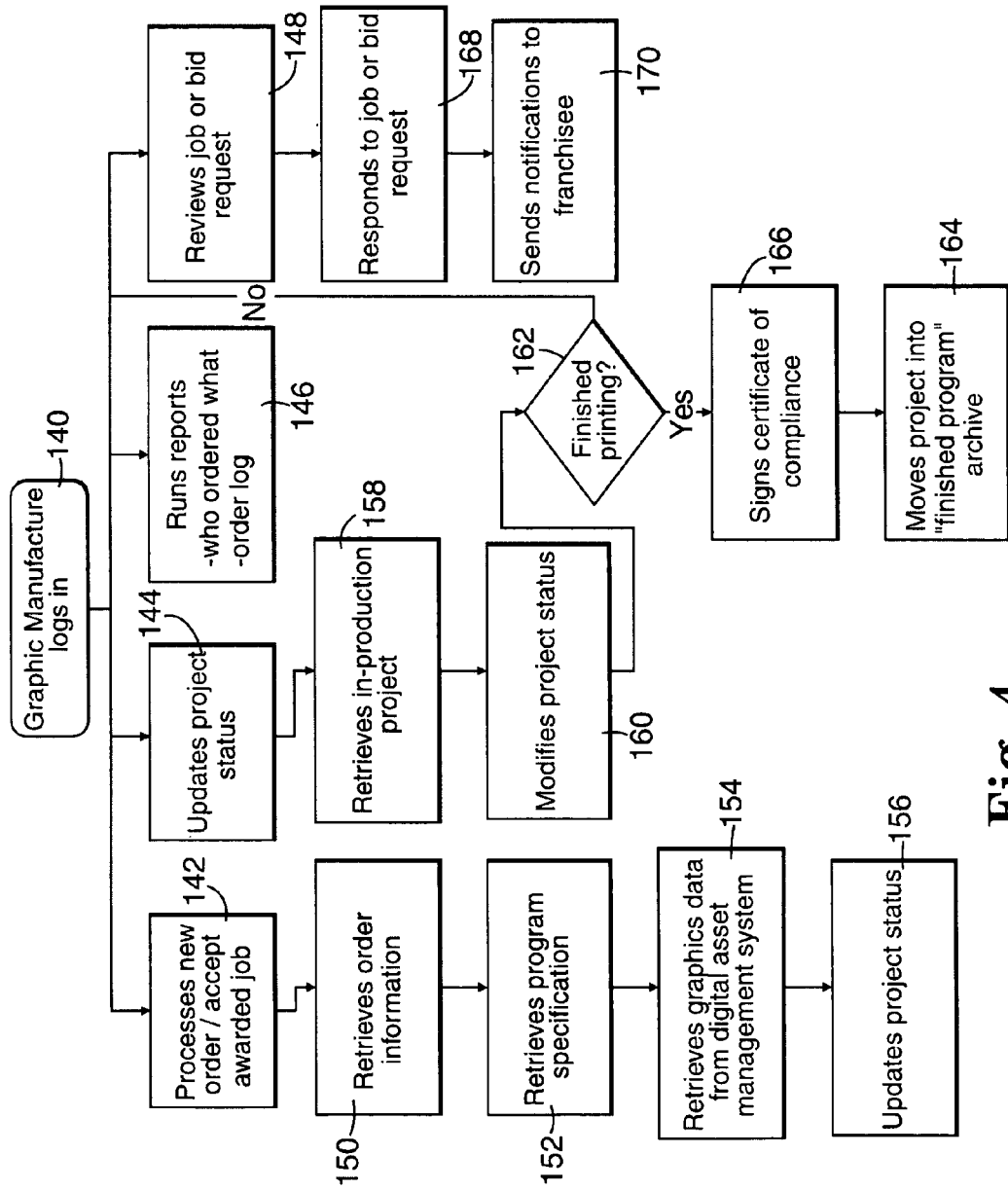
FIG. 4 is a schematic diagram of the process steps available for a third party manufacturer, fabricator or convertor to review new orders, process and/or accept an order, decline an order, respond to a sub-end-user with a counter-proposal, and to update project status information in accordance with a system and method of the present invention.

FIG. 4 schematically diagrams preferable process steps available for a manufacturer to review new orders, process and/or accept an order, decline an order, respond to a sub-end-user with a counter-proposal, and to update project status information in accordance with a system and method of the present invention. Starting at block 140, a manufacturer can launch into the system, again, preferably by way of a user ID and password.

After logging in, a manufacturer can be provided with any number of options including those indicated at blocks 142, 144, 146 and 148. As illustrated, block 142 represents an option to process a new order or to accept an award job. Block 144 represents an option to update project status. Block 146 represents the manufacturer's ability to run reports based upon order information and the like. Block 148 represents the manufacturer's option for reviewing job or bid requests as submitted by sub-end-users.

The processing of new orders and accepting awarded jobs includes a number of steps beyond block 142. First, at block 150 the manufacturer retrieves the necessary order information. Then, at 152 the manufacturer retrieves program specifications that may have been provided by the end-user or submitted along with an order by a sub-end-user. Then, the manufacturer would retrieve the graphics data provided within the digital asset management system, block 154, which digital asset management system comprises the database of digital information related to graphics information stored within the system by the end-user, noted in block 70 and discussed above. At the end of this processing, the manufacturer would update the project status as indicated at block 156.

Block 144 represents a manufacturer's project updating ability that may be conducted at any time or upon periodic updates or scheduled events. Specifically, the manufacturer would retrieve an "in production" project, block 158, and, if appropriate, modify the project status, block 160. Decisions step 162 would be encountered after a project is modified and ask whether or not the project is finished. If NO, a manufacturer would return to the initial option screen. If YES, the project is moved into a "finished program" archive as represented by block 164. If, the situation is such that a certificate of compliance is to be completed (as discussed above with reference to FIG. 5), the manufacturer would complete the certificate of compliance as indicated at block 166, preferably prior to archival. A specific advantage of the present invention is that where a third party, such as a material supplier, provides a warranty covering its materials, and where that third party orchestrates the system the present invention, the certificate of compliance may be electronically and automatically submitted to the third party material supplier to begin the warranty coverage.

Block 148 represents the manufacturer's option to review new job requests and bids. Block 168 represents the manufacturer's ability to review and respond. Block 170 indicates the sending of notice to the sub-end-users based upon a manufacturer's decision to accept a new job or including bid information.

What is evident from the above discussion is that a network based system and method that includes at least an end-user and its sub-end-users facilitates communication of a program with improved product information of an end-user to its sub-end-users. Moreover, it is clear that when one or more manufacturers are also part of the system and method, the entire ordering process can also be accommodated. And even more so, where an interested third party is also part of the system and method, not only can they facilitate the system, orders can be monitored relative to products or services needed by the third party and the third party can automatically institute a warranty program based on the exchange of information within the system and in accordance with a method of the present invention.

The third parties ability to manage such a system also advantageously gives it the opportunity to market its products or services to the end-user, its sub-end-users, and the manufacturers in the making of any particular product according to a specific program of an end-user. Even if the end-user is not an active participant, the knowledge of approved products of the end-user can be sufficient to permit a third party to manage and operate such a system between sub-end-users and the manufacturers, preferably also including the third party itself.

With reference to FIGS. 6 through 10, one specific example of a web browser based system network interface is described as follows for use by a sub-end-user in the system and method of the present invention described above. It is understood that any such network interface technology as known or developed may be utilized and that the screen layouts and interface functionality can be conducted or set up in any number of different ways in accordance with the present invention.

Figure 6:
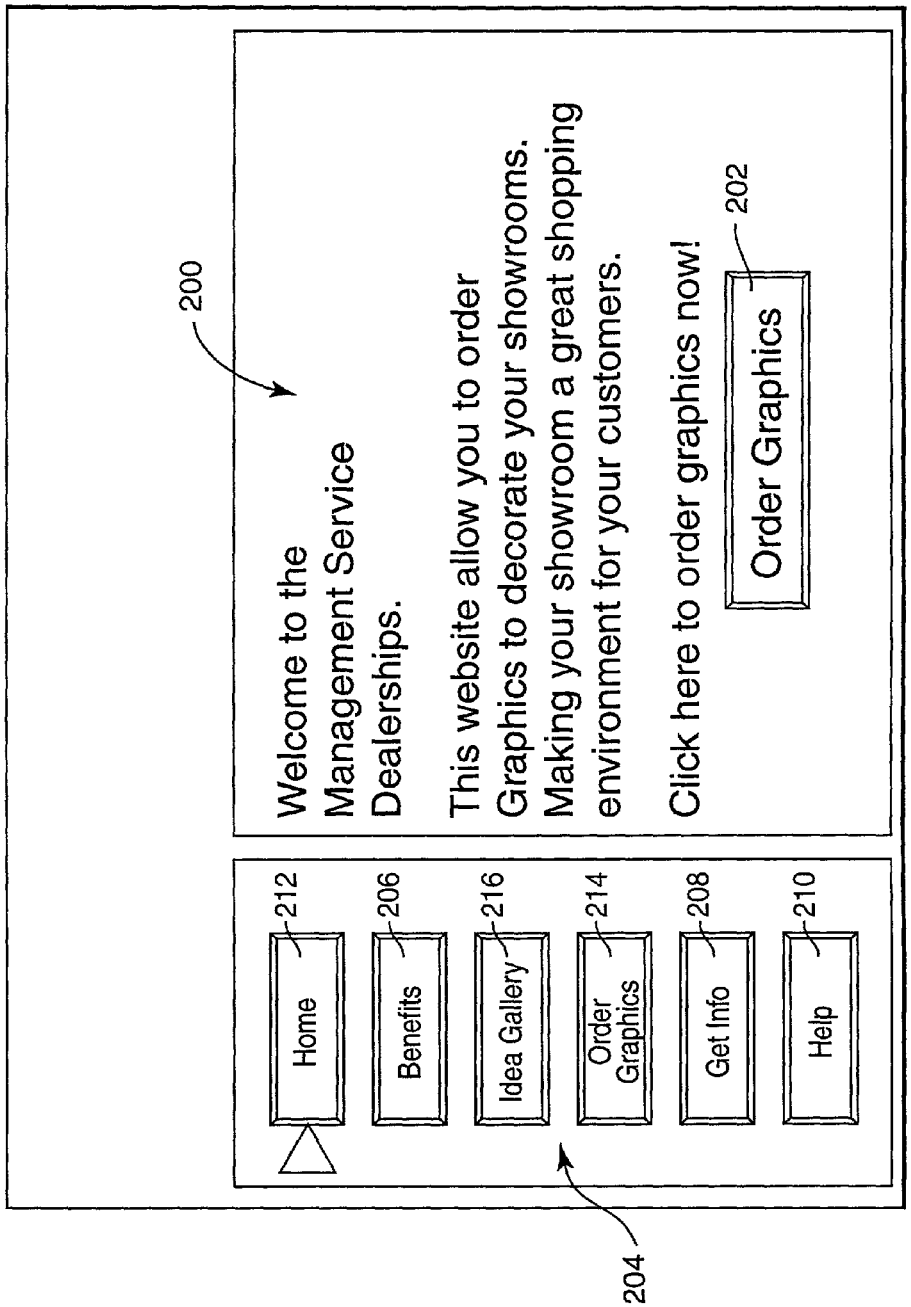
FIG. 6 is an example of a sub-end-user network interface showing an initial page or screen from which a sub-end-user can link to other information and to order graphics products.

Starting with FIG. 6, a screen layout is illustrated that could first be made available to a sub-end-user after logging into the system of the present invention. Basically, this initial screen includes a welcome message 200 and any other basic information and gives a sub-end-user the opportunity to start the process for ordering product, at 202, which according to this example comprises graphics products. Additionally, it is preferred that menu buttons 204 provide the sub-end-user the opportunity to move between any number of other related programs and processes, such as discussed above. As shown, a "Benefits" button 206 may link to a system explanation of advantages of products of a third party managing the system. As set out above, this provides the interested third party the opportunity to market its products and services to the sub-end-users. Other links to additional information 208, help service 210 and web page home 212 may preferably also be included.

Figure 7:
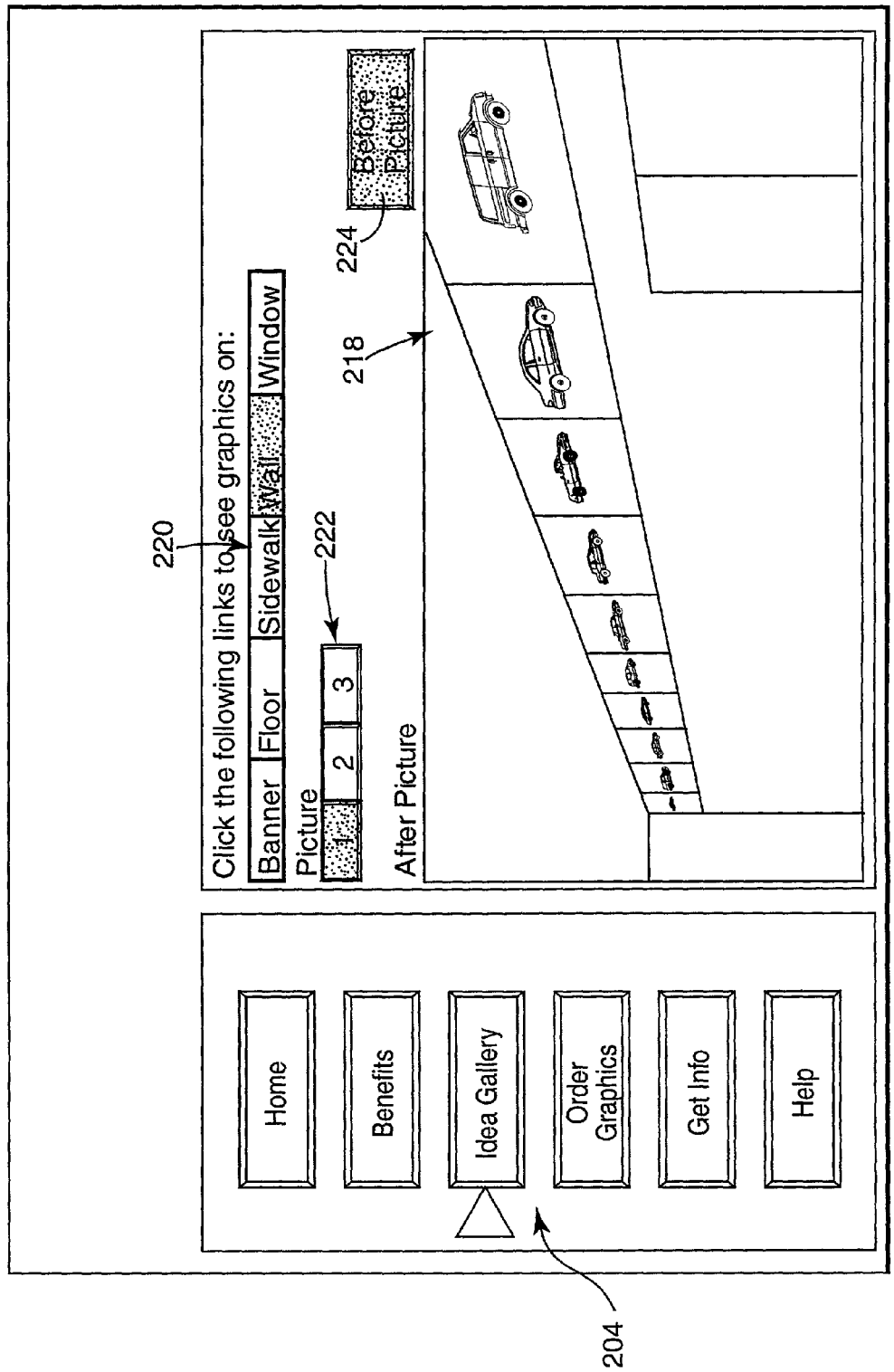
FIG. 7 is an example of a sub-end-user network interface showing an idea gallery page or screen by which a sub-end-user can view sample graphics.

In addition to having a link 214 for ordering graphics, an important tool for marketing third party products and giving the sub-end-user a good idea of that which is approved by the end-user is a link 216 to an "Idea Gallery." As shown in FIG. 7, the idea gallery would preferably provide a picture area 218 for illustrating a specific graphic and its install application based upon selections of the sub-end-user. Preferably, the sub-end-user would be able to choose from an option bar 220 to see sample graphics provided in a number of different applications. That is, as the sub-end-user would choose any of the indicated applications, a new graphic picture would load in the picture area, showing a sample graphic applied in the chosen manner. Specific examples include a graphic illustrated as a banner, or applied to a floor, sidewalk, wall or window. Many other graphic types are contemplated. A similar option bar 222 may also be provided giving the sub-end-user the ability to choose between multiple application pictures. A further toggle button 224 may also permit a sub-end-user to switch between before and after shots with and without graphic products available from the third party. Any number of additional links, graphics, images and the like are contemplated.

Figure 8:
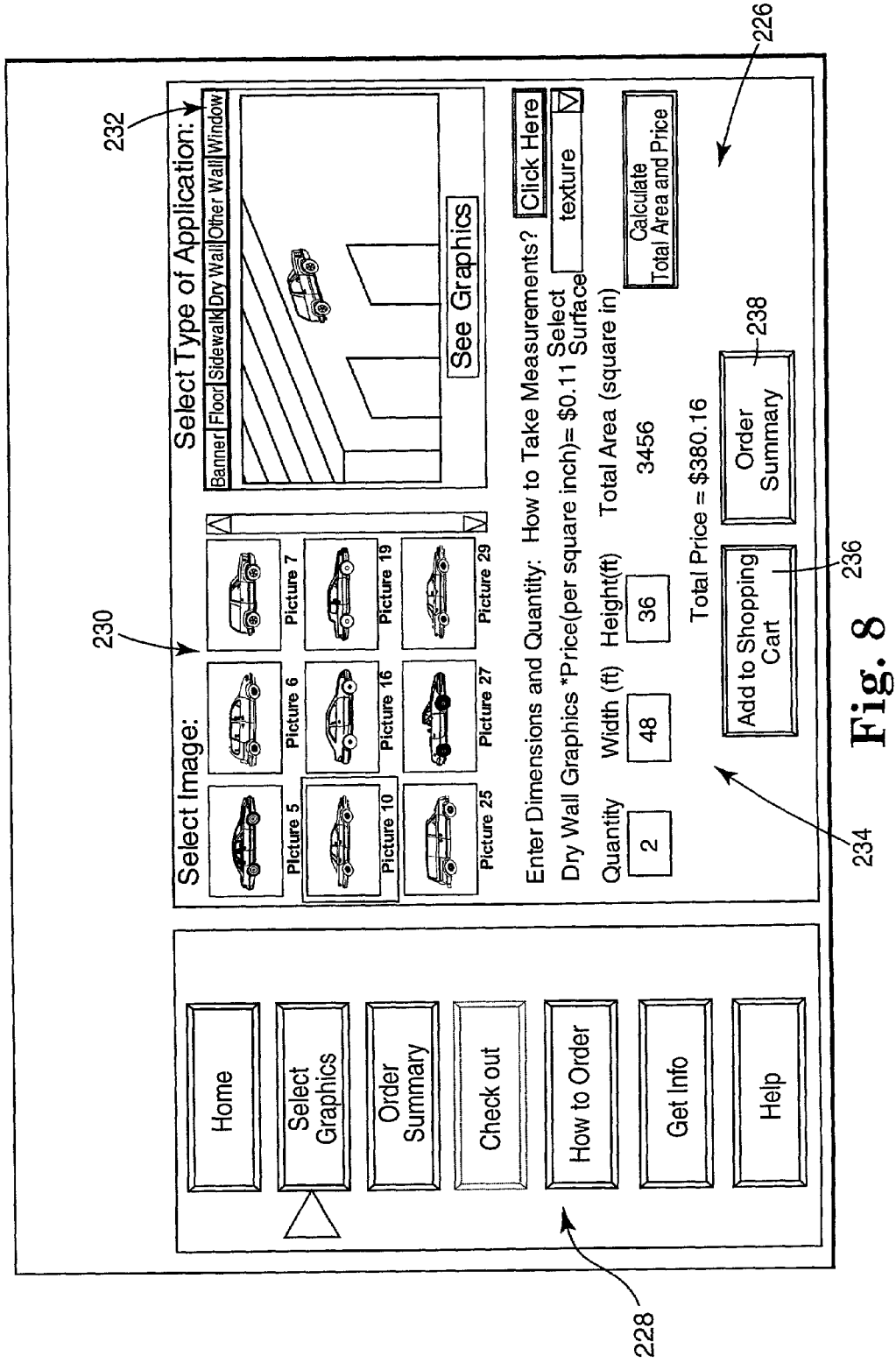
FIG. 8 is an example of a sub-end-user network interface showing a graphics product selection and specification input page or screen by which a sub-end-user can select graphics based upon desired application methods.

If a sub-end-user chooses to order graphics by any of the contemplated ways, the sub-end-user is preferably taken to a selection screen, an example of which is illustrated in FIG. 8. The screen is preferably divided into a product selection portion 226 and a menu button portion 228. As above, the menu button portion 228 can set out any number of desired link buttons, a couple of which will be discussed more detail below.

On the product selection portion 226, it is preferable to provide a catalog area 230 having any number of images or other graphic information from which a user can select. It is also preferable to include an image area 232 that shows the graphics chosen and as applied, which is similar to that described above with reference to FIG. 7. Similar features such as application bar options are preferably also included. Additionally, a specific order information area 234 can track and inform the user of their current selection, its price, quantity, dimension and area information. More or less such information may be included. A link button 236 preferably permits the user to add a selected graphic product into a shopping cart, as such ability is commonly known within Internet based e-commerce. Another link button 238 preferably connects with an order summary screen, discussed below.

Also, in accordance with known Internet based e-commerce, a user may select and add to its shopping cart any number of selected products. It is preferable that for each selection and addition process, the selected graphics show up within the image area 232 where the image can be viewed in a selected application. Moreover, sufficient product information is preferably provided within section 234 so as to effectively inform the user of the product specification information and price. It is preferable also that the selection screen also provide the opportunity for the user to input its selection, the quantity and its height and width requirements for a graphics product. Based on this information, a product can be specified and priced automatically by the system of the subject invention by known means.

Figure 9:
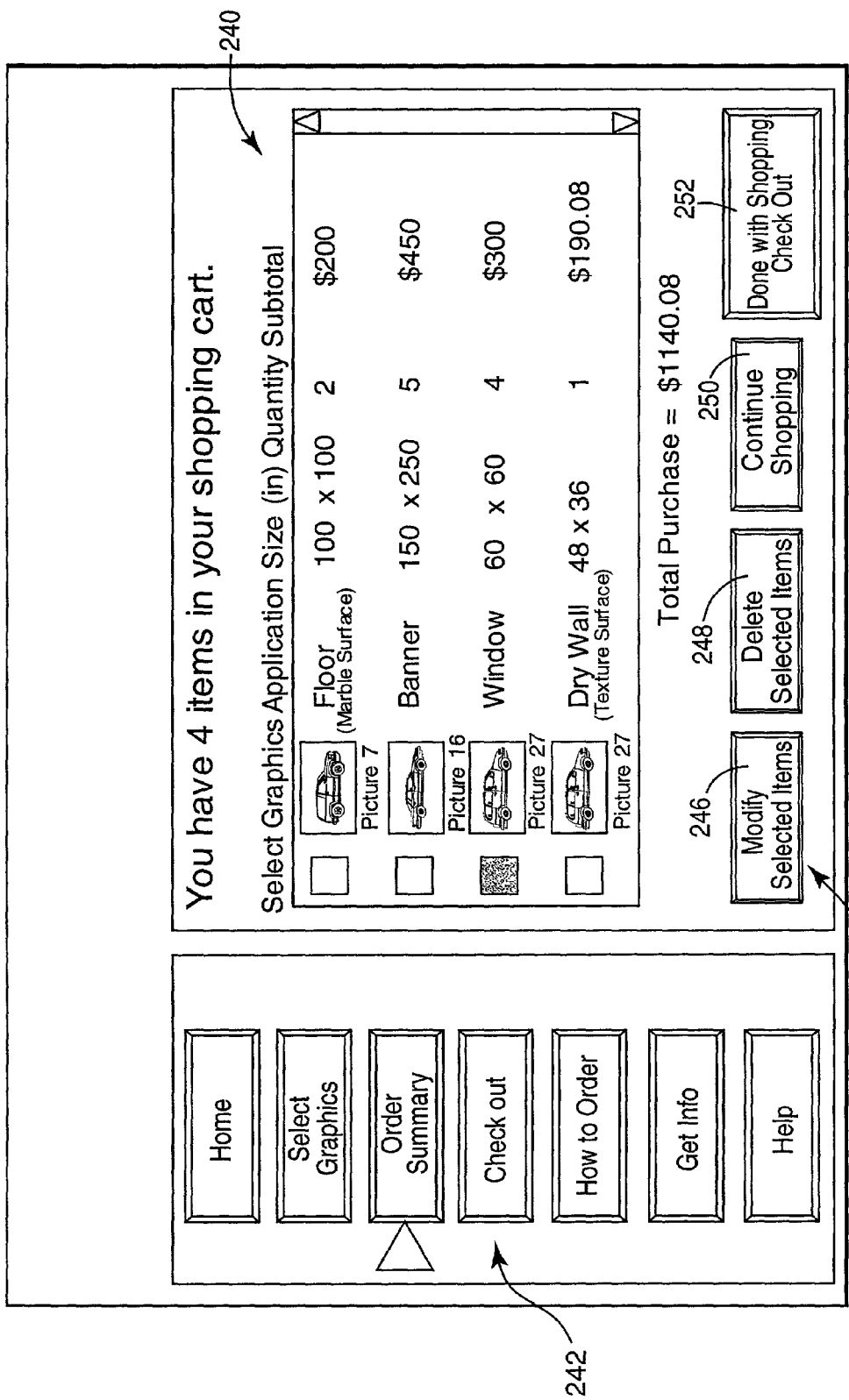
FIG. 9 is an example of a sub-end-user network interface showing an order summary page or screen by which a sub-end-user can view its selected graphics products.

With reference to FIG. 9, an example of an order summary screen is illustrated. Preferably, the screen includes an informational portion 240, menu button portion 242 and buttons 244 related to specific actions related to items on the informational portion 240. For example, within the informational portion 240, each of the selected graphics products in the shopping cart and certain specification information and price may be listed. Preferably, the user will have the opportunity to select any one of the listed items in the shopping cart, which selection will enable the buttons 244. For example, a button 246 may cause the selected graphic to be modified, which modification may occur back at the selection screen. A delete button 248 may cause the selected item to be removed from the shopping cart. Link button 250 would give the user the opportunity to add additional items to the shopping cart. A link button 252 would indicate that a user is done shopping and ready to check out or finalize its order.

Figure 10:
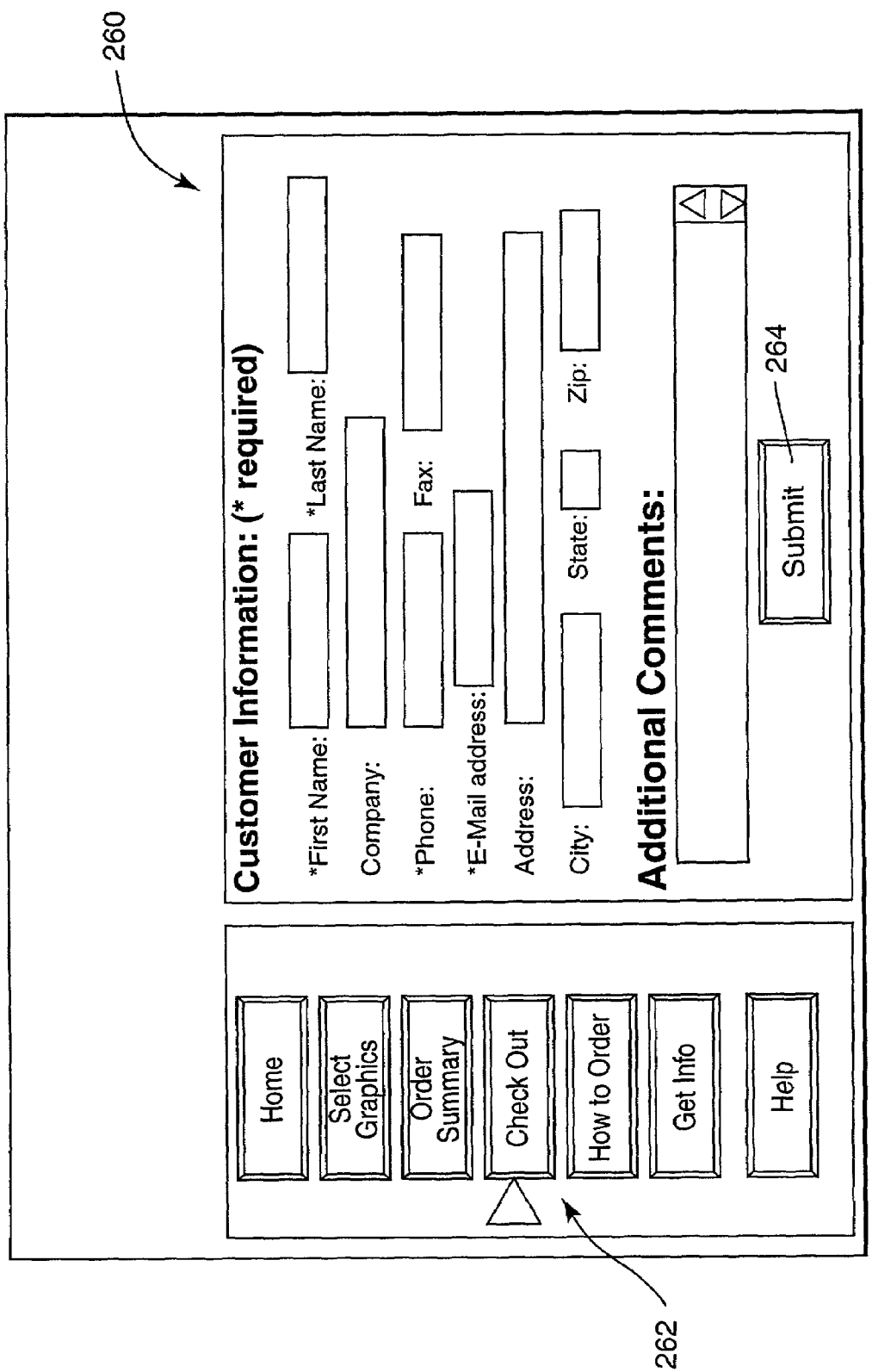
FIG. 10 is an example of a sub-end-user network interface showing a check-out page or screen by which a sub-end-user can review and input relevant information.

An example of one such checkout screen is illustrated in FIG. 10 comprising an informational portion 260 and link button portion 262 having any number of links. Within the informational portion 260, the sub-end-user is preferably prompted to provide specific information identifying the sub-end-user, preferably by company and person. It is further preferable to provide an area where additional comments may be included with specific instructions or questions by the sub-end-user. The purpose of the screen is not only to properly identified the ordering sub-end-user, but to give the sub-end-user the final opportunity to submit its order, such as by way of a link button 264. By selecting the submit button 264, the order is deemed ready for processing in accordance with the further aspects of the present invention and as discussed above.

The specific example detailed above is related to the selection and ordering of graphics products by sub-end-user's based upon approved graphic information of an end-user. Moreover, a third party material supplier is provided the specific opportunity to market its products to be converted into the graphic products by a selected manufacturer. The system, however, may further give the sub-end-user the opportunity to select services and materials of any number of additional other third parties. For example, materials may be chosen as provided by the third party within the system, or without or in combination with materials of others. Additional designer, developer, consultant and installing services can also be accommodated within the subject system in accordance with the present invention.

It is also clear that a system and method of the present invention can be utilized in any number of different types of products where an end-user controls or approves in any way the products or product specifications that are available for a sub-end-user to choose from in its business.

What is claimed is:

1. A system comprising:
a data storage device accessible via a network and having franchisor approved product information stored in a first memory;
a franchisor network interface by which a franchisor can communicate with the data storage device via the network and approve the product information;
a franchisee network interface providing network access by a franchisee to the franchisor approved product information for selecting a product and ordering the selected product and by which product orders can be stored in a second memory, wherein the product selecting and ordering by the franchisee is based upon the approved product information of the franchisor;
a third party network interface providing a third party access to the product orders stored within the second memory and by which the third party manages access of the franchisor approved product information by the franchisee, wherein the third party network interface also permits the third party to communicate a product order to a manufacturer via the network; and
a manufacturer network interface by which the manufacturer can communicate with the data storage device via the network to process the received product order in accordance with the approved product information.

2. The system of claim 1,
wherein the franchisor network interface allows the franchisor to create a program for use by the franchisees, and
wherein the program specifies the products approved by the franchisor and lists specifications associated with the approved products.

3. The system of claim 1, wherein the third party network interface permits the third party to receive a notice from the manufacturer certifying compliance of manufacture with specifications communicated to the manufacturer by the third party.

4. The system of claim 1, wherein the manufacturer network interface further permits the manufacturer to review product orders, update job status, and communicate with the third party via the network.

5. The system of claim 1, wherein the third party network interface permits the third party to begin warranty coverage of a manufactured product based upon inclusion of commercial material of the third party.

6. The system of claim 1, wherein the franchisor network interface further permits the franchisor to create and modify new programs with specific product information.

7. The system of claim 6, wherein the franchisor network interface further permits the franchisor to manipulate the franchisor approved product information stored in the first memory.

8. The system of claim 7, further includes a custom image gallery stored as franchisor approved product information within the first memory of the data storage device.

9. The system of claim 1, wherein the franchisee network interface, the third party network interface, the manufacturer network interface and the franchisor network interface are browser based web page interfaces stored on the data storage device and that are accessible via the network.

10. The system of claim 9, wherein the data storage device is accessible via a public internet.

11. The system of claim 1, wherein the third party network interface end the franchisor network interface allow the third party and the franchisor to build an electronic catalog of product information associated with the franchisor approved product information.

12. The system of claim 11,
wherein the franchisee interface provides the franchisee with access to the electronic catalog of product information for making a product order, and
wherein the system communicates the product order to the third party from the franchisee interface.

13. The system of claim 1, wherein the third party network interface permits the third party to review the product order for any product material and services that are supplied by the third party.

14. The system of claim 1, wherein the third party network interface permits the third party to specify at least one commercial material sold by the third party to be utilized by the manufacturer in making the ordered product.

15. The system of claim 1, wherein the third party network interface electronically receives product information that specifies products associated with the third party and the franchisor approves one or more of the products to be used by the franchisee.

* * * * *

UNITED STATES PATENT AND TRADEMARK OFFICE
CERTIFICATE OF CORRECTION

| | | |
|---|---|---|
| PATENT NO. | : 7,270,267 B2 | Page 1 of 2 |
| APPLICATION NO. | : 09/820398 | |
| DATED | : September 18, 2007 | |
| INVENTOR(S) | : Herbert Kam-Wah Yeung | |

It is certified that error appears in the above-identified patent and that said Letters Patent is hereby corrected as shown below:

Title Page
Item [54] and Col. 1, Line 4, Title, Before "UPON" insert -- BASED --.

Drawings
Line 1, In the drawings, Sheet 1 of 10, Fig. 1, beside reference numeral 34, Delete "Cerificate" and insert -- Certificate --, therefor.
Line 1, In the drawings, Sheet 2 of 10, Fig. 2, reference numeral 74, Delete "modications," and insert -- modifications, --, therefor.
Line 2, In the drawings, Sheet 2 of 10, Fig. 2, reference numeral 74, Delete "modicatioins" and insert -- modifications --, therefor.
Line 1, In the drawings, Sheet 3 of 10, Fig. 3, reference numeral 100, Delete "Reponds" and insert -- Responds --, therefor.
Line 1, In the drawings, Sheet 3 of 10, Fig. 3, reference numeral 126, Delete "Reviewd" and insert -- Reviewed --, therefor.

Column 1
Line 4, in the title, Before "UPON" insert -- BASED --.
Line 54, Delete "know" and insert -- known --, therefor.

Column 7
Line 56, Before "its" delete "a".

UNITED STATES PATENT AND TRADEMARK OFFICE
CERTIFICATE OF CORRECTION

PATENT NO. : 7,270,267 B2
APPLICATION NO. : 09/820398
DATED : September 18, 2007
INVENTOR(S) : Herbert Kam-Wah Yeung It is certified that error appears in the above-identified patent and that said Letters Patent is hereby corrected as shown below:

Column 16
Line 27, In Claim 6, delete "specific" and insert -- specified --, therefor.
Line 32, In Claim 8, delete "includes" and insert -- including --, therefor,
Line 43, In Claim 11, delete "end" and insert -- and --, therefor.

Signed and Sealed this

Thirtieth Day of June, 2009

JOHN DOLL
*Acting Director of the United States Patent and Trademark Office*